Oct. 20, 1959      E. K. HULET      2,909,405
METHOD FOR THE RECOVERY AND PURIFICATION OF BERKELIUM
Filed Feb. 21, 1957
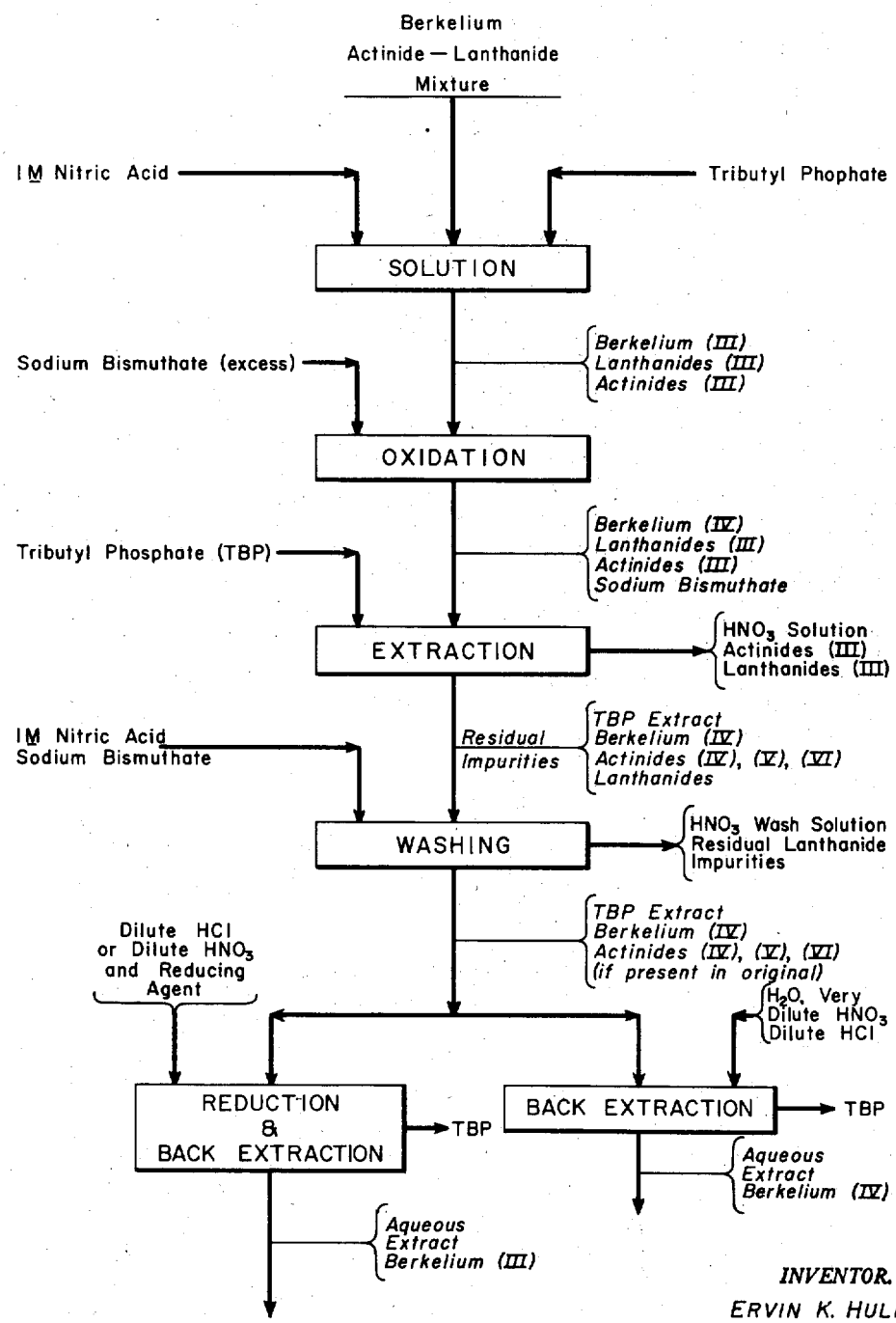
INVENTOR.
ERVIN K. HULET
BY
ATTORNEY.

2,909,405
Patented Oct. 20, 1959

2,909,405

METHOD FOR THE RECOVERY AND PURIFICATION OF BERKELIUM

Ervin Kenneth Hulet, Walnut Creek, Calif., assignor to the United States of America as represented by the United States Atomic Energy Commission Application February 21, 1957, Serial No. 641,770

10 Claims. (Cl. 23—14.5)

The present invention relates in general to the recovery and purification of berkelium and, more particularly, to a solvent extraction process for the recovery and purification of berkelium.

The element berkelium was discovered and produced in December 1949 by Thompson, Ghiorso and Seaborg as the result of the irradiation of $Am^{241}$ with 35 mev. helium ions according to the reaction $Am^{241}(\alpha,2n)Bk^{243}$. Other isotopes including $Bk^{244}$ and $Bk^{245}$ were prepared and identified later by Hulet, Thompson, Ghiorso and Street.

Berkelium is produced by irradiating various lower actinide elements or isotopes with a variety of accelerated particles yielding various nuclear reactions. For example, isotopes of berkelium can be produced by irradiating americium isotopes with alpha particles or neutrons; curium isotopes with deuterons or even by the bombardment of uraninum with accelerated nitrogen ions. As customarily practiced, the target element or isotope is irradiated in a capsule or target structure and the products include various isotopes of fission products and actinide elements which are formed by competing reactions.

Separation of berkelium from such a complex mixture is very difficult and is complicated by the circumstance that the chemical properties are very similar to those of other of the lanthanide and actinide elements. Heretofore, separations have been effected by means of ion exchange processes which involve the adsorption and selective elution of the mixture from ion exchange resins. These methods are effective for group separation but are relatively slow.

A rapid and selective solvent extraction process has now been discovered for the separation and recovery of berkelium from complex mixtures of impurities of the character described. Briefly, such mixture is dissolved in a nitric acid solution which solution is then treated with an excess of a specific oxidizing agent, i.e., sodium bismuthate, to place the berkelium in the tetrapositive ionic oxidation state with certain other of the actinide elements being likewise oxidized. The nitric acid soluton is then contacted with tri-n-butyl phosphate resulting in the selective extraction of such tetra-, penta- and hexa-positive ions away from impurities which remain in the acid solution. Subsequently, the extract is contacted with an aqueous phase, e.g., water, dilute hydrochloric or nitric acid solutions in the absence of said oxidizing agent whereby the berkelium is extracted therein and is spontaneously or by means of reducing agents converted into the tripositive ionic state which is preferentially soluble therein.

Accordingly, it is an object of the present invention to provide a method for the recovery of berkelium from a mixture of other elements.

A further object of the invention is to provide a simple, efficient and economical method for the separation of berkelium from certain actinides and lanthanides.

Another object of the invention is to provide a solvent extraction process in which tetrapositive berkelium ions are selectively extracted into tributyl phosphate.

A still further object of the invention is to provide a solvent extraction process wherein berkelium is selectively extracted away from impurities with tributyl phosphate.

One other object of the invention is to provide a solvent extraction process wherein tetrapositive berkelium ions are selectively extracted into a solvent phase and later the berkelium is selectively extracted with attendant reduction to the tripositive ionic state from said solvent and away from impurities.

Other objects and advantages of the invention will become apparent on consideration of the following description taken in conjunction with accompanying drawing of which the single figure is a flow diagram of the process of the invention.

With reference to said drawing, in operating the process of the invention, there is first produced a dilute nitric acid solution of berkelium in the tripositive ionic state (III) together with lanthanide and actinide impurity elements which are obtained in the usual transmutation methods of producing berkelium. For example, $Am^{241}$ oxide irradiated with about 30–35 mev. alpha particles while contained in a platinum dish in a water cooled target holder yields a crude product from which such an impure berkelium product can be prepared.

A preliminary separation may be employed to reduce the bulk or volume of the crude product by dissolving the material in 6 M $HNO_3$ with heating to about 75° C. Excess $NH_4OH$ is added to precipitate a mixture of actinide and lanthanide hydroxides which are centrifuged from the solution. The hydroxides are dissolved in 3 M HCl and a fluoride precipitation is made with 3 M HF to separate the actinides and lanthanides from impurities. A further hydroxide precipitation, after dissolution of the fluoride in 6 M $HNO_3$ saturated with boric acid, removes the fluoride ions. The hydroxide precipitate is then dissolved in 1.0 N nitric acid solution. The concentration of nitric acid must be quite close to 1.0 N to minimize extraction of impurities.

Selective extraction of the berkelium from such a solution is dependent upon the selective conversion of the berkelium into a tetrapositive ionic state. By tracer techniques it has been ascertained that in 8 M $HNO_3$ solution the oxidation potential for the reaction $Bk(III) \rightarrow Bk(IV)$ is very nearly the same as that for the corresponding change in cerium. Since it seems likely that berkelium is subject to the same type of complex ion formation as cerium which circumstance, as in the case of cerium, must be remembered in considering oxidation potentials of the above couple. The data indicate a value of about 1.6 volts for the $Bk(III) \rightarrow Bk(IV)$ couple. In practice sodium bismuthate has been found completely satisfactory as an oxidizing agent under the 1 M $HNO_3$ conditions noted. To effect the oxidation and maintain the berkelium in the (IV) state, excess solid sodium bismuthate must be present. Also, the oxidation must be conducted with the temperature controlled to within the range of 50 to 70° C. and likewise when extraction is being performed. Above this range the bismuthate is destroyed and oxidation does not occur at reasonably rapid rates at a temperature below this range.

TBP, i.e., normal tributyl phosphate with phase ratios of about one to one, aqueous to organic, is contacted with the nitric acid solution to extract the berkelium. Prior to use the TBP should be washed with either dilute sodium carbonate or sodium hydroxide solution followed by distilled water to remove dibutyl phosphate and other impurities which would interfere with normal operation of the process. Immediately prior to use, the TBP is equilibrated with 1 N HNO$_3$. The contacted phases are agitated or otherwise manipulated to provide effective contact in the presence of excess bismuthate, whereupon the berkelium in the tetrapositive ionic state is extracted into the TBP phase.

Mono and dipositive ions, e.g., alkali and alkaline earth metals, which are present in the nitric acid phase are not extracted to any appreciable extent under the above conditions. Trivalent ions, especially those of the lanthanide and actinide elements, i.e., lanthanide rare earths and the transplutonium actinides—americium, curium, californium and elements 99, 100 and 101 which are not effectively oxidized above the tripositive ionic state under the conditions described are also not effectively extracted. Ions of metals which are tetrapositive or are at least dipositively charged where the metal in the ion is at least pentavalent, such as those of berkelium, thorium, zirconium, cerium, uranium, plutonium, neptunium and minor amounts of americium (III), may be extracted with the berkelium. However, the presence or absence of any of the foregoing materials will depend on the method of synthesis and prior chemical treatment. While extraction may be effected subsequently to oxidation, extraction may also be done concurrently. In the course of extraction some type of compound appears to be formed between the extracted metal ion and extractant molecules which compound dissolves in the excess of the TBP phase.

Following extraction, the phases are separated and the TBP extract phase is washed repeatedly with portions of 1 M HNO$_3$ containing some sodium bismuthate to maintain the berkelium in the IV oxidation state. Essentially all tripositive impurities, e.g., lanthanides (III) and americium which have a lesser tendency for extraction into TBP than berkelium (K=0.14 for Am III) are removed by this treatment. Residual sodium bismuthate remains with the aqueous phase on separation leaving a purified TBP extract phase. The indicated concentration, i.e., 1 N HNO$_3$ used in the wash, is fairly critical in minimizing the tendency of berkelium IV to be removed thereby.

The purified TBP phase containing the berkelium and the indicated impurities is then subjected to extraction with an aqueous phase under conditions which promote the selective extraction of the berkelium. In general, berkelium has a strong tendency to re-extract into a neutral or mildly acidic aqueous phase, as do thorium, zirconium, cerium, uranium, plutonium, neptunium and minor amounts of americium. However, these products do not normally interfere, as they are not normally present. If present, they may be eliminated in a previous or subsequent purification, e.g., ion exchange may be used. Also, most of the foregoing products are not extracted when the aqueous phase has an acid concentration within the range of 1 M. Only cerium, americium and berkelium are extracted under these conditions. Ordinarily less acid is needed and contact of the TBP phase with several portions of water or very dilute HNO$_3$ or HCl (e.g., 0.01 to 0.05 N) will selectively extract the berkelium. The tendency of berkelium to re-extract into an aqueous phase is enhanced in the absence of the sodium bismuthate. The IV oxidation state ion of berkelium is unstable under these conditions and is slowly reduced to the III state by other components in the solution. Alternatively, re-extraction can be accelerated by employing an aqueous reducing agent solution or preferably a dilute hydrochloric acid solution (0.01 to 0.2 N) having therein a stoichiometric excess of a reducing agent such as hydroxylamine hydrochloride, hydrazine hydrochloride, or ferrous and titanous salts.

While cerium and other rare earths previously mentioned are not separated by the present process as noted above, they are not ordinarily found in the same product mixtures as berkelium. Where present, however, in such quantities that it is desirable to separate them from the berkelium, various ion exchange processes have been found most convenient. For example, separation may be accomplished by making the solution of berkelium (III) and cerous values 12 N with respect to hydrochloric acid, adsorbing the metals on a column of sulfonic acid type cation exchange resin, and eluting with concentrated hydrochloric acid, whereby the berkelium and then the cerium are obtained in eluate fractions.

Upon completion of the separation process, the berkelium may be recovered from any of the above product solutions by any convenient conventional method, such as precipitation as a fluoride or evaporation to dryness. Sodium bismuthate is the preferred oxidizing agent for present purposes due to the very unique and specific nature of its oxidizing action. Very little berkelium is extracted from 1 N nitric acid into TBP when oxidizing agents like bromate, persulfate, and permanganate are used due to complexing actions. However, when sodium bismuthate is used as the oxidizing agent, a high percentage of the berkelium is extracted. The sodium bismuthate has the additional advantage in that the reducing agent is converted into an insoluble Bi$_2$O$_3$ product during the oxidation step and this material can be conveniently filtered off or decanted with the HNO$_3$ phase thus avoiding contamination of the extract.

The following example is a further illustration of the process of the invention.

*Example*

The target obtained from the alpha particle bombardment of americium oxide and containing berkelium and usual fission and transmutation products including lanthanides and actinides was dissolved in 6 M nitric acid in a platinum dish. Ammonium hydroxide was added to precipitate the metals as their hydroxides. After separation by centrifugation, the precipitate was dissolved in 3 M hydrochloric acid and the resultant solution was made 3 M in hydrofluoric acid to precipitate the insoluble fluorides of the rare earths and the transneptunium metals. A solution of the fluoride precipitate in 6 M nitric acid, which was saturated with boric acid to complex excess fluoride, was treated with ammonium hydroxide to form a hydroxide precipitate and this precipitate was dissolved in about 1 ml. of 1 M nitric acid. To this solution was added an equal volume of TBP which was prewashed with a solution of sodium hydroxide or sodium carbonate, then water and pre-equilibrated with 1 M nitric acid. Oxidation of the berkelium to the IV state was accomplished by adding solid sodium bismuthate to the solution at 50° C. with vigorous stirring for about 15 minutes and while maintaining a surplus of solid bismuthate in the solution mixture. The precipitate, consisting primarily of bismuth oxides and/or subnitrate, was centrifuged from the filtrate and the upper TBP layer was separated and stored. The acid layer was again extracted as above with TBP with the addition of bismuthate and, after separation, the TBP was combined with the extract from the first extraction. After washing the TBP extract three times with 1.0 M nitric acid having an excess of sodium bismuthate, the berkelium was extracted into HCl of about 0.1 M concentration to which a small amount of hydrazine hydrochloride solution had been added. Residual TBP was extracted from the HCl extract into ether and the solution was heated to evaporate the extract to dryness. Assay indicated that the dry product produced by evaporation of the solvent contained 92% berkelium and 8% of americium.

What is claimed is:

1. In a process for separating and recovering berkelium values from admixture with impurities, the steps comprising producing a solution of said admixture in about 1 N HNO$_3$, treating said solution with sodium bismuthate at a temperature in the range of 50 to 70° C. to oxidize the berkelium to the IV oxidation ionic state, whereby at least a portion of the impurity ions remain in a lower oxidation state, contacting said solution with normal tributyl phosphate to preferentially extract the berkelium away from said lower oxidation state impurity ions, and separating the normal tributylphosphate extract from the solution.

2. In a process for separating and recovering berkelium values from admixture with impurities, the steps comprising producing a solution of said admixture in about 1 N HNO₃, treating said solution with sodium bismuthate at a temperature in the range of 50 to 70° C. in the presence of a normal tributyl phosphate phase, whereby berkelium is oxidized and preferentially extracted in the IV oxidation state into the normal tributyl phosphate and away from lower oxidation state impurities ions which remain in the solution, separating the normal tributyl phosphate extract from the solution, and preferentially extracting the berkelium together with actinide impurities from the normal tributyl phosphate phase by contact with an aqueous phase.

3. In a process for separating and recovering berkelium values from admixture with impurities, the steps comprising producing a solution of said admixture in about 1 N HNO₃, treating said solution with sodium bismuthate at a temperature in the range of 50 to 70° C. in the presence of a normal tributyl phosphate phase, whereby berkelium is ozidized and preferentially extracted in the IV oxidation state into the normal tributyl phosphate together with highly oxidized actinide impurity ions including those of Th, U, Np and Pu and away from lower oxidation state ions including actinides and lanthanides in the III oxidation state, separating the normal tributyl phosphate extract from the solution, and preferentially extracting the berkelium together with said actinide impurities from the normal tributyl phosphate extract phase by contact with an aqueous phase.

4. In a process for separating and recovering berkelium values from admixture with impurities, the steps comprising producing a solution of said admixture in about 1 N HNO₃, treating said solution with sodium bismuthate at a temperature in the range of 50 to 70° C. in the presence of a normal tributyl phosphate phase, whereby berkelium is oxidized and preferentially extracted in the IV oxidation state into the normal tributyl phosphate together with highly oxidized actinide impurity ions including those of Th, U, Np and Pu and away from lower oxidation state ions including actinides and lanthanides in the III oxidation state, separating the normal tributyl phosphate extract from the solution, preferentially extracting the berkelium together with said actinide impurities from the normal tributyl phosphate extract phase by contact with an aqueous phase, and recovering berkelium values from the aqueous phase by evaporation.

5. In a process for separating and recovering berkelium values from admixture with impurities, the steps comprising producing a solution of said admixture in about 1 N HNO₃, treating said solution with sodium bismuthate at a temperature in the range of 50 to 70° C. in the presence of a normal tributyl phosphate phase, whereby berkelium is oxidized and preferentially extracted in the IV oxidation state into the normal tributyl phosphate together with highly oxidized actinide impurity ions including those of Th, U, Np and Pu and away from lower oxidation state ions including actinides and lanthanides in the III oxidation state, separating the normal tributyl phosphate extract from the solution, and preferentially extracting the berkelium together with said actinide impurities from the normal tributyl phosphate extract phase by contact with an aqueous phase selected from the group consisting of H₂O, dilute HCl and dilute HNO₃.

6. In a process for separating and recovering berkelium values from admixture with impurities, the steps comprising producing a solution of said admixture in about 1 N HNO₃, treating said solution with sodium bismuthate at a temperature in the range of 50 to 70° C. in the presence of a normal tributyl phosphate phase, whereby berkelium is oxidized and preferentially extracted in the IV oxidation state into the normal tributyl phosphate together with highly oxidized actinide impurity ions including those of Th, U, Np and Pu and away from lower oxidation state ions including actinides and lanthanides in the III oxidation state, separating the normal tributyl phosphate extract from the solution, and preferentially extracting the berkelium together with said actinide impurities from the normal tributyl phosphate extract phase by contact with a dilute HCl phase containing a reducing agent.

7. In a process for separating and recovering berkelium values from admixture with impurities, the steps comprising producing a solution of said admixture in about 1 N HNO₃, treating said solution with sodium bismuthate at a temperature in the range of 50 to 70° C. in the presence of a normal tributyl phosphate phase, whereby berkelium is oxidized and preferentially extracted in the IV oxidation state into the normal tributyl phosphate together with highly oxidized actinide impurity ions including those of Th, U, Np and Pu and away from lower oxidation state ions including actinides and lanthanides in the III oxidation state, separating the normal tributyl phosphate extract from the solution, and preferentially extracting the berkelium together with said actinide impurities from the normal tributyl phosphate extract phase by contact with a dilute HCl acid phase containing a reducing agent selected from the group consisting of hydroxylamine hydrochloride, hydrazine hydrochloride, ferrous chloride and titanous chloride.

8. In a process for separating and recovering berkelium values from a crude product, the steps comprising dissolving said crude product in 6 N nitric acid, adding ammonium hydroxide to separate the actinide and other metals from the bulk of impurities as their hydroxides, recovering the precipitate by centrifugation, dissolving the precipitate in hydrochloric acid, adding hydrofluoric acid until the concentration thereof is 3M to precipitate the insoluble fluorides and transneptunium metals, separating said precipitate, dissolving said precipitate in 6 M HNO₃ saturated with boric acid to complex excess fluoride whereby hydroxides are precipitated, recovering said hydroxide precipitate, producing a solution of said admixture in about 1 N HNO₃, treating said solution with sodium bismuthate at a temperature in the range of 50 to 70° C. in the presence of a normal tributyl phosphate phase, whereby berkelium is oxidized and preferentially extracted in the IV oxidation state into the normal tributyl phosphate together with highly oxidized actinide impurity ions including those of Th, U, Np and Pu and away from lower oxidation state ions including actinides and lanthanides in the III oxidation state, separating the normal tributyl phosphate extract from the solution, and preferentially extracting the berkelium together with said actinide impurities from the normal tributyl phosphate extract phase by contact with an aqueous phase.

9. In a process for separating and recovering berkelium values from impurities, the step comprising contacting a 1 N HNO₃ solution of said values and impurities having excess sodium bismuthate therein and at a temperature in the range of 50 to 70° C. with a normal tributyl phosphate phase to preferentially extract the berkelium in the IV oxidation state away from impurities in a lower oxidation state.

10. In a process for separating and recovering berkelium values from admixture with impurities, the steps comprising producing a solution of said admixture in about 1 N HNO₃, treating said solution with sodium bismuthate at a temperature in the range of 50 to 70° C. in the presence of a normal tributyl phosphate phase, whereby berkelium is oxidized and preferentially extracted in the IV oxidation state into the normal tributyl phosphate together with highly oxidized actinide impurity ions including those of Th, U, Np and Pu and away from lower oxidation state ions including actinides and lanthanides in the III oxidation state, separating the normal tributyl phosphate extract from the solution, and preferentially extracting the berkelium from the normal tributyl phosphate extract phase by contact with an aqueous phase of 1 N $HNO_3$.

References Cited in the file of this patent

UNITED STATES PATENTS

| | | |
|---|---|---|
| 2,683,655 | Peppard et al. | July 13, 1954 |
| 2,767,044 | Hill et al. | Oct. 16, 1956 |
| 2,848,300 | Warf | Aug. 19, 1958 |

OTHER REFERENCES

Seaborg et al.: "The Actinide Elements," 1st ed., pages 531–535, 1954.

"Proceedings of the International Conference on the Peaceful Uses of Atomic Energy," vol. 9. Held in Geneva August 8–20, 1955, United Nations, New York, 1956, pages 464–479.